(12) United States Patent
Mehta et al.

US006844389B2

(10) Patent No.: US 6,844,389 B2
(45) Date of Patent: Jan. 18, 2005

(54) ETHYLENE POLYMER COMPOSITIONS HAVING IMPROVED MELT STRENGTH

(75) Inventors: Sameer D. Mehta, Mason, OH (US); Harilaos Mavridis, Cincinnati, OH (US); Venki Chandrashekar, Houston, TX (US); Edward S. Vargas, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 195 days.

(21) Appl. No.: 10/027,742

(22) Filed: Dec. 20, 2001

(65) Prior Publication Data

US 2003/0130399 A1 Jul. 10, 2003

(51) Int. Cl.$^7$ ................................................. C08L 3/34
(52) U.S. Cl. ..................... 524/445; 524/447; 524/236; 524/570; 524/584; 525/240
(58) Field of Search ................................ 524/445, 236, 524/370; 525/70

(56) References Cited

U.S. PATENT DOCUMENTS

| | | | | |
|---|---|---|---|---|
| 5,717,000 | A | * 2/1998 | Karande et al. | ............... 521/83 |
| 6,051,643 | A | 4/2000 | Hasegawa et al. | |
| 6,136,908 | A | 10/2000 | Liao et al. | |
| 6,300,398 | B1 | * 10/2001 | Jialanella et al. | ........... 524/275 |
| 6,403,231 | B1 | * 6/2002 | Mueller et al. | ........... 428/474.4 |
| 6,414,070 | B1 | * 7/2002 | Kausch et al. | ............... 524/445 |
| 6,462,122 | B1 | * 10/2002 | Qian et al. | ................... 524/445 |
| 6,521,690 | B1 | * 2/2003 | Ross et al. | ................... 524/445 |
| 6,583,209 | B2 | * 6/2003 | Mehta et al. | ................ 524/445 |
| 6,610,770 | B1 | * 8/2003 | Ross et al. | ................... 524/445 |
| 2001/0033924 | A1 | * 10/2001 | Qian et al. | ............... 428/297.1 |

FOREIGN PATENT DOCUMENTS

| | | |
|---|---|---|
| DE | 198 42 845 A | 4/1999 |
| EP | 1 050 557 A1 | 11/2000 |
| NL | 1 007 434 C | 7/1999 |

OTHER PUBLICATIONS

Wang, K. H.; Choi, M. H.; Koo, C. M.; Choi, Y. S.; Chung, I. J. Polymer 2001, 42, 9819–9826.*

Mehta, S.D., et al.: U.S. Appl. No. 09/947,836 entitled "Propylene Polymer Composites Having Improved Melt Strength." Filing Date: Sep. 6, 2001, Projected Publication Date: Mar. 6, 2003.

Jeon, H.G., et al.: "Morphology of Polymer/Silicate Nanocomposites," *Polymer Bulletin* 41: 107–113 (1998).

Lim, Y.T. et al.: "Phase Morphology and Rheological Behavior of Polymer/Layered Silicate Nanocomposites." *Rheol Acta* 40: 220–229 (2001).

Hasegawa, N., et al.: "Preparation and Mechanical Properties of Polypropylene–Clay Hybrids Using a Maleic Anhydride Modified Polypropylene Oligomer," Journal of Applied Polymer Science vol. 67: 87–92 (1988).

Solomon, M.J., et al.: "Rheology of Polypropylene/Clay Hybrid Materials." *Macromolecules: 34*: 1864–1872 (2001).

Oya, A.: "Polypropylene–Clay Nanocomposites." *Polymer–Clay Nanocomposites*: pp. 151–172: Wiley Series in Polymer Science. John Wiley & Sons, Ltd. (2000).

Zhang, Y.H., et al.: "Effect of Quaternary Ammonium–Modified Montmorillonites on Mechanical Properties of Polypropylene." *Materials Res. Society Symposium Proceedings*, vol. 520, pp. 191–195. (Apr. 13–15, 1998).

Kurokawa, Y., et al.: "Structure and Properties of a Montmorillonite/Polypropylene Nanocomposite." *J. Materials Science Letter*: 16: 1670–1672 (1997).

Oya, A., et al.: "Factors Controlling Mechanical Properties of Clay Mineral/Polypropylene Nanocomposite." *J. Materials Science*: 35: 1045–1050 (2000).

Reichert, P., et al.: "Poly(propylene)/Organoclay Nanocomposite Formation: Influence of Compatibilizer Functionality and Organoclay Modification." *Macromol. Mater. Eng.*: 275: 8–17 (2000).

Kodgire, P., et al.: "PP/Clay Nanocomposites: Effect of Clay Treatment on Morphology and Dynamic Mechanical Properties." *J. Applied Polymer Science*: vol. 81: 1786–1792 (2001).

Svoboda, P., et al.: "Structure and Mechanical Properties of Polypropylene and Polystyrene/Organoclay Nanocomposites." Dept. Chemical Engineering, Ohio State University, (9 pages).

Galgail, G., et al.: "A Rheological Study on the Kinetics of Hybrid Formation in Polypropylene Nanocomposites." *Macromolecules: 34*: 852–858 (2001).

Kim, K–N, et al.: "Mixing Characteristics and Mechanical Properties of Polypropylene–Clay Composites." Dankook University (5 pages).

Wang, K.H., et al.: "Synthesis and Characterization of Maleated Polyethylene/Clay Nanocomposites." *Polymer 42*: 9819–9826 (2001).

Wang, K.H., et al.: "Effect of Aspect Ratio of Clay on Melt Extensional Process of Maleated Polyethylene/Clay Nanocomposites." *Polymer Bulletin*: 46: 499–505 (2001).

Kawasumi, M., et al.: "Preparation and Mechanical Properties of Polypropylene–Clay Hybrids." *Macromolecules: 30*: 6333–6338 (1997).

* cited by examiner

*Primary Examiner*—David W. Wu
*Assistant Examiner*—Rip A. Lee
(74) *Attorney, Agent, or Firm*—Gerald A. Baracka; William A. Heidrich

(57) ABSTRACT

Ethylene polymer composites and concentrates utilized for their preparation are provided. The composites of the invention have increased melt strength compared to the base resin and other improved physical characteristics. The composites contain an organically modified clay and may also contain a compatibilizng agent, depending on the base resin used.

15 Claims, No Drawings

ETHYLENE POLYMER COMPOSITIONS HAVING IMPROVED MELT STRENGTH

BACKGROUND OF THE INVENTION

1. Field of the Invention

The invention relates to improved ethylene polymer composites and to masterbatch compositions utilized for their preparation. Ethylene polymer composites produced in accordance with the invention have increased melt strength and other improved physical properties. A clay modified with a hydrogenated tallow quaternary ammonium ion containing one or more $C_{18}$ alkyl substituents is combined with the ethylene polymer base resin. Depending on the base resin used, a compatibilizing agent may also be present.

2. Description of the Prior Art

Ethylene polymers are some of the most widely used polyolefin polymers. They are employed for the production of film and sheet goods, fibers, molded goods, etc., utilizing a variety of known processes such as extrusion and coextrusion, blow molding, injection molding, thermoforming and the like.

In extrusion processes such as those used for the production of films, fibers and molded goods, the resins must have sufficiently low melt viscosity under the high shear conditions encountered in the extruder in order to have acceptable processability and achieve the high throughputs necessary for commercial operation. On the other hand, the resins must have sufficient melt strength after extrusion to prevent sagging/distortion of the extrudate before it is cooled below the resin melt point. High melt strength resins are therefore highly advantageous in these operations. They are particularly advantageous for the production of large thermoformed and blow molded articles. For example, a blow molding resin suitable for production of small shampoo bottles may not have sufficient melt strength for the production of one-gallon milk jugs where the parison is substantially larger and heavier. High melt strength ethylene polymer resins are also highly desirable for extrusion coating and foamed and sheet extrusion processes.

Whereas some types of ethylene polymers, such as low density polyethylene (LDPE) and ethylene-vinyl acetate (EVA) copolymers, are generally regarded to have sufficient melt strength for most of the aforementioned applications, other ethylene polymer resins, most notably high density polyethylene (HDPE) and linear low density polyethylene (LLDPE) resins, are deficient in this regard. In fact, these latter types of resins are frequently subjected to post reactor treatments, such as oxidation treatments, during finishing in order to raise the melt strength of the resins to acceptable levels. While such treatments are capable of increasing the melt strength of certain HDPE and LLDPE resins, it is often at the expense of other physical properties, e.g., environmental stress crack resistance. It would be highly advantageous if the melt strength of HDPE and LLDPE could be improved without the use of such treatments.

The incorporation of organically modified clays, sometimes referred to as intercalates or organoclays, produced by a cation exchange reaction between the clay and alkylammonium salt, into polyolefins is known in the prior art. The alkylammonium cations exchanged into and between the clay platelets increase interlayer spacing between adjacent platelets and render the hydrophilic clay organophilic and thus more easily dispersed in the polyolefin resins. Compared to conventional filled polyolefin compositions, polyolefins filled with the intercalated organoclays have improved physical properties at similar loading levels.

HDPE/modified silicate nanocomposites are disclosed by Jeon, et al., in their article "*Morphology of Polymer/Silicate Nanocomposites,*" Polymer Bulletin 41: 107–113 (1998). The polymer composites which contain 20% dodecylamine-modified montmorillonite clay are obtained by dissolving the HDPE and modified clay in a co-solvent of xylene and benzonitrile and precipitating in tetrahydrofuran. Lim, Y. T., et al., in their article "*Phase Morphology and Rheological Behavior of Polymer/Layered Silicate Nanocomposites,*" Rheol Acta 4: 220–229 (2001), report the fabrication of nanocomposites with organophilic modified clays and polyethylene base resins grafted with 0.8 weight percent maleic anyhydride. The nanocomposites are formed by melt-mixing.

Compatibilizing agents are commonly employed to facilitate incorporation of modified clays into non-polar polymers such as polyolefins. Compatbilizers are generally maleic anhydride grafted polymers employed at a weight ratio of 3:1 (compatibilizer:organoclay). While polyolefin composites have been prepared using ratios of compatibilizer to organoclay as low as 1:1, the lower ratios are generally considered to be less desirable and, therefore, are typically avoided. For example, Hasegawa, et al., in an article entitled "*Preparation and Mechanical Properties of Polypropylene-Clay Hybrids Using a Maleic Anhydride Modified Polypropylene Oligomer,*" JAPS 67, 87 (1998), observe that as the ratio of compatibilizer to organically modified clay is increased, the particles of the silicate layers become smaller and are dispersed more uniformly so that the reinforcement effect of the clays is increased.

In copending application Ser. No. 09/947,836, propylene polymer composites having improved melt strengths obtained by incorporating specific modified organoclays and compatibilizing agents at low compatibilizer levels and at low ratios of compatibilizer to modified clay are disclosed.

SUMMARY OF THE INVENTION

We have now discovered that it is also possible to significantly improve the melt strength of ethylene polymer composites. In one embodiment of the invention the composites are comprised of 76 to 99.25 weight percent, based on the weight of the total composition, of an ethylene polymer base resin; 0.5 to 12 weight percent of an organically modified clay consisting of a smectite clay that has been ion-exchanged and intercalated with a quaternary ammonium ion of the formula:

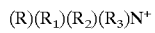

$$(R)(R_1)(R_2)(R_3)N^+$$

where R represents a $C_{18}$ alkyl substituent and $R_1$, $R_2$ and $R_3$ are independently selected from the group consisting of R, H or a $C_{1-22}$ hydrocarbyl group; and 0.25 to 12 weight percent of ethylene polymer compatibilizing agent. Ethylene polymer compatibilizing agents include ethylene-vinyl carboxylate copolymers and polymers obtained by copolymerizing or grafting 0.1 to 8 weight percent ethylenically unsaturated carboxylic acid or derivative monomer with ethylene or an ethylene polymer. The weight ratio of organically modified clay to compatibilizer will range from 1:5 to 1:0.1. Preferred composites of this type contain 84 to 98.75 weight percent base resin, 1 to 8 weight percent modified clay and 0.25 to 8 weight percent comptabilizing agent, the modified clay and compatibilizer being present at a weight ratio from 1:1 to 1:0.25.

In another embodiment of the invention the composites are comprised of 88 to 99.5 weight percent ethylene-vinyl carboxylate base resin and 0.5 to 12 weight percent of the organically modified clay.

Preferred organically modified clays are montmorillonite clays modified with dimethyl dihydrogenated tallow ammonium chloride and preferred compatibilizing agents are ethylene-vinyl acetate (EVA) copolymers or ethylene polymers grafted with 0.2 to 4 weight percent maleic anhydride. It is especially useful if the modified clay has a modifier concentration of 90 to 130 meq/100 g and the compatibilizing agent has a melt index from 0.2 to 2500 g/10 min.

Concentrates or masterbatches used to prepare composites of the invention are also claimed herein. The concentrates comprise 20 to 70 weight percent ethylene polymer carrier and 30 to 80 weight percent additives comprising an organically modified smectite clay that has been ion-exchanged and intercalated with a quaternary ammonium ion and, optionally, an ethylene polymer compatibilizing agent. Preferred compatibilizing agents are ethylene-vinyl carboxylate copolymers and polymers obtained by copolymerizing or grafting an ethylene polymer with 0.2 to 4 weight percent maleic anhydride. The weight ratio of organically modified clay to compatibilizing agent preferably ranges from 1:5 to 1:0.1. Especially useful concentrates contain 20 to 60 weight percent carrier resin and 40 to 80 weight percent organically modified clay and compatibilizing agent present at a weight ratio from 1:1 to 1:0.25 with up to 5 weight percent other conventional compounding additives.

DETAILED DESCRIPTION

In accordance with the present invention, there is provided ethylene polymer compositions, also referred to herein as composites, having increased melt strength as a result of the use of specific organoclay/compatibilizer combinations. Moreover, with such composites it is possible to achieve enhanced melt strength and improve other physical properties utilizing significantly lower levels of compatibilizer and lower ratios of compatibilizer to organoclay than heretofore considered possible. In another aspect of the invention, similar improvements in properties are achieved with ethylene-vinyl carboxylate copolymer base resins utilizing the organoclays without a compatibilizing agent.

The increased melt strength or melt elasticity of the inventive compositions is evidenced by a noticeable upturn in their dynamic rheological data at low frequencies. By upturn is meant that the dynamic complex viscosity increases with decreasing frequencies at frequencies of less than about 1.0 rad/sec. In contrast, the ethylene polymer base resins not formulated in accordance with the invention generally exhibit a limiting constant value at frequencies of about <0.1 rad/sec. This complex viscosity upturn, which is measured in terms of $\Delta G_o^*$, is an indication that the composites of the invention have superior melt strength compared to the base resins. Enhanced melt strength is also indicated by high complex viscosities ($\eta^*$) at low frequencies. The relative increase in complex viscosity of the composite as compared to the base resin is expressed by the ratio of complex viscosity of the composite to the base resin at a frequency of 0.1 radians/second.

$\Delta G_o^*$ is the difference, i.e., increase, in $G_o^*$ obtained for the composite material over the $G_o^*$ value observed for the ethylene polymer base resin. It can be expressed by the equation:

$$\Delta G_o^* = (G_o^*)_{composite} - (G_o^*)_{base\ resin}$$

$\Delta G_o^*$ is expressed in dynes/cm$^2$. In general, the higher the $\Delta G_o^*$ value, the greater the improvement in melt strength of the composite over the base resin. The procedure used to measure the rheological properties of the base resins and composites and determine the viscosity upturn is detailed in the examples.

As will be recognized by those skilled in the art, specific $\Delta G_o^*$ values referred to herein are provided only to demonstrate the viscosity upturn, i.e., melt strength increase, obtained for the composites of the invention and are not intended to be limiting since they are generated under a specific set of conditions. Rheological data generated using different conditions, e.g., temperature, percent strain, plate configuration, etc., could result in $\Delta G_o^*$ and complex viscosity ratio values which are higher or lower than those recited in the specification and claims which follow.

Ethylene polymer base resins utilized to obtain the composites of the invention include ethylene homopolymers and ethylene copolymers and mixtures thereof. Useful copolymers are typically comprised of ethylene, as the major component, and a $C_{3-8}$ α-olefin, vinyl $C_{2-4}$ carboxylate or $C_{1-4}$ alkyl (meth)acrylate.

Representative ethylene homopolymers and ethylene-$C_{3-8}$ α-olefin copolymers include LDPE, LLDPE, HDPE, very low density polyethylene (VLDPE) and plastomers, medium density polyethylene (MDPE) and very high density or high and ultra high molecular weight polyethylene resins produced using known procedures such as Ziegler, Phillips or metallocene polymerization processes. Ethylene-vinyl acetate (EVA) copolymers are representative of ethylene-vinyl carboxylate polymers which can be used and ethylene-ethyl acrylate (EEA) and ethylene-n-butyl acrylate (ENBA) copolymers are illustrative ethylene-alkyl acrylate copolymers.

Comonomer contents of the ethylene-$C_{3-8}$ α-olefin copolymers will typically range from 0.1 to 45 weight percent and, more preferably, from 0.5 to 40 weight percent. Vinyl acetate contents of EVA copolymers will typically range from 2 and 48 weight percent and, more preferably, from 4 to 45 weight percent. Acrylate monomer contents for the EEA and ENBA copolymers are typically from 1 to 48 weight percent and, more preferably, form 2.5 to 45 weight percent.

The invention is particularly advantageous to increase the melt strength of HDPE and LLDPE resins. Useful HDPEs have densities in the range 0.941 g/cm$^3$ to 0.970 g/cm$^3$. Ethylene homopolymers having densities of 0.958 to 0.970 g/cm$^3$ and copolymers of ethylene and butene-1, hexene-1 or octene-1 having densities of 0.941 to 0.959 g/cm$^3$ are especially preferred HDPEs for the compositions of the invention. Especially useful LLDPE resins have densities from 0.912 to 0.940 g/cm$^3$ and, more preferably, from 0.915 to 0.935 g/cm$^3$ and contain one or more comonomers selected from the group consisting of butene-1, hexene-1 and octene-1. Densities reported herein are determined in accordance with ASTM D 1505.

The invention is also highly useful to improve the melt strength of resins produced using metallocene or single-site catalysts which typically have low melt strength due to their narrow molecular weight distributions. An example of such resins are the so-called plastomers and elastomers which have densities between 0.857 and 0.915 g/cm$^3$.

Organoclays employed for the invention are smectite-type clays modified by reacting the clay with a quaternary ammonium ion. The resulting cation exchanged clay, due to the incorporation of organic cations between the layers of the clay, exhibits organophilic character which facilitates dispersion in the ethylene polymer resin.

Smectite clays are well known in the art as are the methods for modification with quaternary ammonium compounds. Representative smectite clays which can be employed include montmorillonite, bentonite, hectorite, saponite, beidellite and the like. Of these clays, montmorillonite clays and, more particularly, montmorillonite clays having exchange capacities of at least 50 milliequivalents per 100 grams of clay are preferred.

For the purpose of this invention, clays of the above types and particularly montmorillonite clays, are reacted with a quaternary ammonium compound having one or more $C_{18}$ alkyl substituents. More specifically, the quaternary ammonium ion corresponds to the formula:

where R represents a $C_{18}$ alkyl substituent or mixture of alkyl substituents wherein the $C_{18}$ alkyl moieties constitute 50% or more of the mixture. $R_1$, $R_2$ and $R_3$ are independently selected from the group consisting of R, H or a $C_{1-22}$ hydrocarbon group. Mixed alkyl substituents are typically obtained utilizing amines derived from natural sources such as beef tallow or mutton tallow. R moieties obtained from such natural products correspond to the constituent fatty acids and typically are mixtures of aliphatic radicals comprised of predominantly $C_{14-18}$ carbon atoms. The carbon number range and distribution within the carbon number range, i.e., percentage of each component, can vary depending on factors such as the tallow source, treatment and age of the tallow. Typical constituent fatty acid values have, however, been generated and are as follows:

| Constituent Fatty Acid | Beef Tallow | Mutton Tallow |
|---|---|---|
| Myristic ($C_{14}$) | 6.3% | 4.6% |
| Palinitic ($C_{16}$) | 27.4% | 24.6% |
| Stearic ($C_{18}$) | 14.1% | 31.5% |
| Oleic ($C_{18:1}$) | 49.6% | 36.0% |
| Linoleic ($C_{18:2}$) | 2.5% | 4.3% |

Source: CRC Handbook of Chemistry and Physics, 74th ed. (1993–94), pages 7–29.

Thus, when hydrogenated and even allowing for variations in tallow composition referred to above, it is expected that the $C_{18}$ alkyl substituents will comprise at least 60% by weight and, more typically, at least 65% by weight of the R groups. More specifically, it is anticipated R would be comprised of approximately 5% $C_{14}$, 30% $C_{16}$, and 65% $C_{18}$ alkyl groups.

Montmorillonite clays modified with dimethyl dihydrogenated tallow ammonium ion (abbreviated 2M2HT) and represented by the formula:

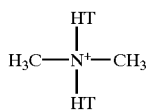

where HT represents the hydrogenated tallow group are particularly effective for the invention. Furthermore, modified clays of this type are available from commercial sources at different modifier concentrations. For example, Southern Clay Products, Inc., offers three montmorillonite clay products modified to different levels with dimethyl dihydrogenated tallow ammonium chloride, namely, Cloisite® 6A with a modifier concentration of 140 meq/100 g, Cloisite® 15A with a modifier concentration of 125 meq/100 g and Cloisite® 20A with a modifier concentration of 95 meq/100 g. While all three of these modified clays can be employed for the invention, montmorillonite clay modified with dimethyl dihydrogenated tallow ammonium chloride at a modifier concentration of 90 to 130 meq/100 g is particularly advantageous.

To obtain the improved composites of the invention, an ethylene polymer compatibilizing agent is employed with the organically modified clay when the base resin is an ethylene homopolymer or ethylene-α-olefin copolymer. Useful compatibilizing agents include ethylene-vinyl carboxylate copolymers and polymers of ethylene having about 0.1 to 8 weight percent ethylenically unsaturated carboxylic acid or derivative monomer copolymerized or grafted. As used herein the term "grafting" denotes covalent bonding of the grafting monomer to the polymer chain.

Useful ethylene-vinyl carboxylate copolymer compatibilizing agents are obtained by the copolymerization of ethylene and vinyl esters of $C_{2-4}$ carboxylic acids using conventional procedures. Ethylene-vinyl acetate copolymers having vinyl acetate contents from 3 to 35 weight percent and, more preferably, 4 to 30 weight percent are particularly useful compatibilizers of this type.

Ethylene polymer compatibilizers modified by polymerizing or grafting using an ethylenically unsaturated carboxylic acid or acid derivative monomer, such as acid anhydrides, esters, salts, amides, imides, or the like, can also be employed. Illustrative acid and acid derivative monomers include but are not limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo (2.2.2)oct-5-ene-2,3-dicarboxylic acid anhydride, 1,2,3,4,5, 8,9,10-octahydronaphthalene-2,3-dicarboxylic acid anhydride, 2-oxa-1,3-diketospiro(4.4)non-7-ene, bicyclo (2.2.1)hept-5-ene-2,3-dicarboxylic acid anhydride, maleoprimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride (XMNA).

Maleic anhydride is a preferred monomer for these compatibilizing agents and it is particularly advantageous when the maleic anhydride is grafted on the ethylene polymer. When the ethylenically unsaturated carboxylic acid or acid derivative monomer is grafted, and particularly when grafting maleic anhydride, the ethylene polymer compatibilizing agent will preferably contain about 0.2 to 4 weight percent of the grafting monomer. In general, the same types of ethylene polymers employed as the base resin for the composite compositions can be grafted and used as the compatibilizing agent. This includes both ethylene homopolymers and copolymers.

Ethylenically unsaturated carboxylic acid or acid derivative monomers are grafted onto ethylene polymers using conventional procedures known to those skilled in the art. For example, grafted ethylene polymer compatibilizers may be prepared in solution, in a fluidized bed reactor, or by melt grafting. Particularly useful grafted products are conveniently prepared by melt blending the ethylene polymer in the substantial absence of a solvent with a free radical generating catalyst, such as a peroxide, and the grafting comonomer using a shear-imparting extruder reactor. Twin screw extruders, such as those marketed by Werner-Pfleiderer, are especially useful for melt grafting. Since substantial amounts of solvent are to be avoided, the catalyst and graft monomer are preferably added directly to the reactor.

Graft reactions are typically carried out temperatures above the decomposition temperature of the free radical generating catalyst; however, excessive temperatures are avoided to minimize or avoid rapid vaporization and consequent losses of the catalyst and graft comonomer. A temperature profile where the temperature of the polymer melt is increased over the length of the extruder up to a maximum in the reaction zone and then decreases toward the extruder output is preferred. Temperature attenuation facilitates processing of the resulting modified product for pelletization or the like. When using maleic anhydride and di-tert-butyl peroxide, a preferred free radical initiator, operating temperatures within the extruder generally range from 190° C. up to 215° C.

While the ethylene polymer compatibilizing agents can have melt indexes (MIs) from 0.2 to 2500 g/10 min, MIs more typically range from about 0.25 to 40 g/10 min. MIs of the compatibilizer are most preferably in the range 0.35 to 30 g/10 min. MIs are determined in accordance with ASTM D-1238, Condition E.

The composites are comprised of from 76 to 99.25 percent of the ethylene homopolymer or copolymer base resin with 0.5 to 12 percent of the organically modified clay and 0.25 to 12 percent of the compatibilizing agent. All of the above percentages are weight percentages and are based on the total weight of the composite. Additionally, the weight ratio of organically modified clay to compatibilizer will range from about 1:5 to 1:0.1. Especially useful composites will contain 84 to 98.75 percent ethylene homopolymer or copolymer, 1 to 8 percent organically modified clay and 0.25 to 8 percent of the compatibilizing agent. Preferred composites have a weight ratio of clay to compatibilizer from 1:1 to 1:0.25.

In one embodiment of the invention for the preparation composites wherein the base resin is an ethylene-vinyl carboxylate copolymer, use of a compatibilizing agent with the modified clay is optional. While it is possible to include a modified ethylene polymer, such as HDPE grafted with maleic anhydride, or an ethylene-vinyl carboxylate copolymer which is different than that employed for the base resin as a compatibilizer for the base resin and modified clay, improved physical properties can be achieved in some instances without a compatibilizer. This is particularly so when the base resin is EVA. Composites of this type contain 88 to 99.5 weight percent ethylene-vinyl carboxylate copolymer and 0.5 to 12 percent organically modified clay of the type described above. Especially useful composites of this type are comprised of 92 to 99 weight percent EVA and 1 to 8 weight percent organically modified clay.

The composites of the invention are prepared by melt compounding the ingredients. Prior to melt compounding all or a portion of the components may be dry blended to facilitate this operation. Also, a concentrate or masterbatch containing the modified clay and/or compatibilizing agent and any other additives, such as antioxidants and the like, may be utilized to facilitate mixing with and incorporation in the ethylene polymer base resin. The composite materials may be used directly as obtained from the melt compounding operation or, as is more commonly the case, the products may be stored for subsequent use. When the composites are to be retained, they are typically pelletized or put in some other form suitable for handling.

The use of concentrates to more effectively incorporate compounding ingredients into polyolefin resins is well known. This procedure is also useful since it minimizes the number of materials which must be stored and handled by processors. The procedure involves preparing a concentrate, i.e., masterbatch, having relatively high concentrations of modified clay, compatibilizing agent and any other optional additives and present in the appropriate ratios using a carrier resin in which the additives can be readily dispersed and which is compatible with the ethylene polymer base resin used for the composite. The carrier resin used for the concentrate may be the same as the composite base resin or can be a resin from the same polymer family, but preferably having better processability than the base resin. The concentrate, typically in pellet form or some other form suitable for handling, is then "letdown" into the ethylene polymer base resin to achieve the desired level of organoclay, compatibilizer and other additives desired in the final product.

Concentrates utilized for the present invention generally utilize an ethylene homopolymer or copolymer as the carrier resin. As pointed out above, this polymer may be the same or different than the base resin polymer. The concentrates will contain 20 to 70 weight percent carrier resin and 30 to 80 weight percent additive components, which includes the modified clay and, if present, the compatibilizing agent and any other optional additive components. The above weight percentages are based on the weight of the total concentrate. Especially useful concentrates are comprised of 20 to 60 weight percent carrier resin and 40 to 80 weight percent additive components. The weight ratio of modified clay to compatibilizing agent in the concentrate will be the same as specified for the composites.

Conventional compounding additives commonly used with ethylene polymer compositions may also be included in the composites of the invention; however, they typically will be present in a combined amount of less than 5 weight percent. More typically, the total concentration of all additives will not exceed 2 weight percent. Representative additives which may be included are heat stabilizers, antioxidants, processing aids, nucleating agents, colorants, clarifiers, UV stabilizers, acid scavengers and coupling agents, such as silanes. Additionally, conventional fillers, such as talc, can also be employed in which case the total amount of optional additives may be as high as 30 weight percent.

Composites produced in accordance with the invention will have MIs generally in the range 0.01 to 100 g/10 min and, more preferably, from 0.02 to 50 g/10 min. $\Delta G_o^*$ values will typically be greater than 100 dyne/cm$^2$. Complex viscosity ratios at low frequency (0.1 radians/sec) are greater than 1.10.

In addition to having enhanced melt strength, composites produced in accordance with the invention can have other improved physical properties compared to the base resin or to compositions prepared using other organically modified clays and compatibilizing agents. For example, HDPE composites typically exhibit improved stiffness and environmental stress crack resistance.

The composites of the invention may be advantageously used for a variety of applications including thermoforming, blow molding, extrusion coating and foamed and sheet extrusion. By using the composites it is possible to eliminate or reduce problems heretofore associated with certain ethylene polymer base resins. For example, the upturn in complex viscosity and corresponding increase in melt strength obtained with the composites of the invention make it possible to increase parison hang times. This is highly advantageous when blow molding larger parts which require larger parisons. Also, in thick (0.25–1.5 inch) sheet extrusion processes where resins have a tendency to sag as they exit the die and before they contact the chill roll, use of the composite materials of the invention can eliminate or at least significantly reduce sagging and any operational problems associated therewith. Similar advantages can be realized when the composites of the invention are utilized in thermoforming and extrusion coating processes.

The following examples are given to illustrate the scope of the invention. These examples are provided for illustrative purposes only and the invention embodied therein should not be limited thereto. All percentages in the examples are on a weight basis.

Rheological properties were determined using a Rheometrics ARES rheometer. Rheological data were generated by measuring dynamic rheology in the frequency sweep mode to obtain complex viscosities ($\eta^*$), storage modulus (G') and loss modulus (G") for frequencies ranging from 0.0251 to 398 rad/sec for each composition. The rheometer was operated at 190° C. when the base resin was HDPE and at 150° C. when the base resin was LLDPE or EVA in the parallel plate mode (plate diameter 50 mm) in a nitrogen environment (in order to minimize sample oxidation/degradation). The gap in the parallel plate geometry was 1.2–1.4 mm and the strain amplitude was 10 percent. Rheological properties were determined using standard test procedure ASTM D 4440-84.

The measure of viscosity upturn, $\Delta G_o^*$ of each composite was determined from the rheological data using a modified Casson plot of $\sqrt{G^*}$ vs. $\sqrt{\omega}$ wherein $G^*$ is the absolute value of dynamic modulus and $\omega$ is the frequency. The five lowest frequency points for each data set were used to obtain an intercept value $G_o^*$ at $\omega=0$ by the linear extrapolation method. $\Delta G_o^*$ is the difference in $G_o^*$ between the composite and the base resin. It is a measure of the upturn, i.e., increase, in complex viscosity of the nanocomposite materials of the invention.

All ingredients were incorporated into the ethylene polymer base resin utilizing a masterbatch procedure. Unless otherwise noted, the masterbatches/concentrates contained 50 weight percent modified clay and 25% compatibilizing agent so as to provide a ratio of modified clay to compatibilizer of 1:0.5 in the composite. The carrier resin comprised the balance, i.e., 25% of the masterbatch. When a silane coupling agent was used, the silane was added to the modified clay. To prepare the masterbatch, the modified clay was fed into a twin screw extruder along with a side feed of compatibilizing agent, if present, and carrier resin. The strand of molten concentrate exiting the extruder was pelletized in an underwater pelletizer.

To prepare the composites, appropriate amounts of concentrate pellets and base resin pellets were dry blended and compounded on the twin screw extruder. For example, to obtain composites containing 88% base resin, 6% modified clay, 3% compatibilizing agent and 3% carrier resin, 12 parts concentrate (having a weight ratio of modified clay to compatibilizing agent of 1:0.5) was let down into 88 parts base resin.

A ZSK-30 twin screw extruder (30 mm screw diameter; L/D 38.7) was utilized for processing the masterbatches and composites. Different temperature profiles were used in the extruder depending on the carrier resin and base resin. Temperature profiles used in the examples were as follows:

Temperature Profile I:
Zone 1—190° C.; Zone 2—200° C.; Zones 3 and 4—210° C.; Zones 5,6 and 7—200° C.; Zone 8—210° C.; Zone 9—200° C.

Temperature Profile II:
Zone 1—180° C.; Zone 2—210° C.; Zones 3 and 4—220° C.; Zones 5 and 6—230° C.; Zone 7—220° C.; Zone 8—190° C.; Zone 9—180° C.

Temperature Profile III:
Zone 1—150° C.; Zones 2 and 3—200° C.; Zones 4,5,6 and 7—210° C.; Zone 8—190° C.; Zone 9—180° C.

Temperature Profile IV:
Zone 1—160° C.; Zones 2 thru 9—170° C.

EXAMPLE 1

A HDPE composite was prepared in accordance with the invention. The HDPE base resin used was a commercially available ethylene homopolymer (MI 1.7 g/10 min; density 0.958 g/cm$^3$). The resin is generally considered to have good barrier properties; however, melt strength is considered to be marginal for bubble stability. The modified clay used as 2M2HT having a modifier concentration of 125 meq/100 g and the compatibilizer (MI 9.5 g/100 g) was a polyethylene resin (HDPE) grafted with 2% maleic anhydride. The same HDPE resin was used as the base resin and carrier resin for the masterbatch. The masterbatch also contained 0.52% 3-aminopropyltriethoxysilane coupling agent. Temperature Profile I was used for both the masterbatch and composite preparation. The resulting composite exhibited a substantial increase in melt strength over the HDPE base resin. Rheological data for the composite and the base resin (Control 1) are provided in Table 1. The $\eta^*$ ratio reported in the table is $(\eta^*_{0.1})_{composite}/(\eta^*_{0.1})_{base\ resin}$.

EXAMPLES 2 AND 3

Example 1 was repeated except that an ethylene-vinyl acetate copolymer compatibilizing agent was used. The composite of Example 2 contained 3% EVA having a MI of 6 and vinyl acetate content of 28%. The composite of Example 3 contained 3% EVA having a MI of 0.45 and vinyl acetate content of 19%. Whereas the improvement in melt strength was significantly larger with the composite of Example 2, both HDPE composites showed increased melt strength compared to the base resin (Control 1). Rheological test results are set forth in Table 1.

COMPARATIVE EXAMPLE A

To demonstrate the role and criticality of the compatibilizing agent, Example 1 was repeated except that the compatibilizer used for the HDPE composite was an ethylene-methyl acrylate-glycidyl methacrylate terpolymer. The terpolymer had a MI of 6 and contained 25% methyl acrylate and 8% glycidyl methacrylate. There was no improvement in $G_o^*$ over the HDPE base resin for the composite containing the E-MA-GMA compatibilizer. In fact, $G_o^*$ for the comparative composite was less (105 dyne/cm$^2$) than that of the base resin (142 dyne/cm$^2$) suggesting that melt strength was adversely affected when the compatibilizing agent used with the modified clay was not an ethylene polymer grafted with maleic anhydride or EVA copolymer.

EXAMPLE 4

A composite was prepared following the procedure of Example 1 except that the HDPE homopolymer used as the base resin had a MI of 0.58 g/10 min and density of 0.958 g/cm$^3$. The concentrate used for preparation of the composite was the same as in Example 1 except the carrier resin was the 0.58 MI HDPE base resin. The resulting composite had a MI of 0.50 and exhibited improved melt strength versus the base resin. $G_o^*$ for the composite was 1174 dyne/cm$^2$ compared to 212 dyne/cm$^2$ for the base resin (Control 4). Complete rheological data for the composite and base resin are set forth in Table 1.

COMPARATIVE EXAMPLE B

Example 4 was repeated except that the maleic anhydride-grafted HDPE compatibilizing agent was replaced with the same E-MA-GMA compatibilizer used in Comparative Example A. $G_o^*$ of the resulting composite was only 152 dyne/cm$^2$ The fact that the $G_o^*$ value obtained with the comparative composite is less than the $G_o^*$ value of the base resin (212 dyne/cm$^2$) indicates a reduction in melt strength of the comparative composite.

EXAMPLE 5

To demonstrate the ability to improve the melt strength of LLDPE resins a composite was prepared in accordance with the invention following the procedure of Example 1. The base resin used for the composite of this example was a LLDPE ethylene-hexene-1 copolymer (MI 0.83 g/10 min; density 0.915 g/cm$^3$). The masterbatch used was the same as employed for Example 1. Temperature Profile II was used to prepare the composite of this example. Based on the rheological data, a significant improvement in melt strength was observed for the composite compared to the base resin (Control 5). Rheological data for the composite and LLDPE base resin are tabulated in Table 1.

EXAMPLE 6

To further demonstrate the versatility of the invention, a HDPE copolymer composite was prepared. The base resin and carrier resin employed for the masterbatch was an ethylene-butene-1 HDPE copolymer having a MI of 0.38 g/10 min and density of 0.949 g/cm$^3$. Copolymer resins of this type are commonly used for pipe extrusion. The modified clay was 2M2HT having a modifier concentration of 95 meq/100 g and the compatibilizer was the same as employed in Example 1. No silane coupling agent was used for this example. Temperature Profile III was used for preparation of the composite and masterbatch. The resulting composite exhibited a substantial increase in melt strength over the HDPE resin (Control 6) as evidenced by the rheological data set forth in Table 1.

EXAMPLE 7

Example 1 was repeated using a high molecular weight ethylene-butene-1 copolymer as the base resin. The HDPE copolymer had a MI of 0.15 g/10 min and density of 0.949 g/cm$^3$ Resins of this type are commonly used for blown film extrusion. Temperature Profile II was used for the composite extrusion. The masterbatch used was the same as that used for Example 1. The HDPE composite had a markedly higher $G_o^*$ value than the base resin indicating improvement in melt strength. Rheological data for the composite and base resin (Control 7) are found in Table 1.

EXAMPLE 8

Example 6 was repeated except that the base resin used was a high molecular weight ethylene-butene-1 copolymer (MI 0.08 g/10 min; density 0.949 g/cm$^3$). Extrusion of the composite was conducted using Temperature Profile III. The masterbatch used was the same as used for Example 6. Rheological data for the resulting composite indicated significantly higher melt strength compared to the base resin (Control 8). Data are set forth in Table 1.

EXAMPLE 9

An EVA composite was prepared in accordance with the invention. The example demonstrates the ability to enhance melt strength without using a separate compatibilizer component when the base resin is ethylene-vinyl carboxylate copolymer. The EVA base resin used had a MI of 8.91 g/10 min and vinyl acetate content of 9%. The masterbatch used to prepare the composite contained 50% 2M2HT modified clay (125 meq/100 g), 25% EVA base resin and 25% HDPE (MI 2 g/10 min; density 0.958 g/cm$^3$). The masterbatch and composite were extruded using Temperature Profile IV. $G_o^*$ for the composite containing the modified clay was significantly higher than that of the base resin evidencing an upturn in the complex viscosity typically associated with an improvement in melt strength. Rheological results are set forth in Table 1. Rheological data for the base resin (Control 9) are also presented.

EXAMPLE 10

An EVA composite was prepared identically to that described in Example 9 except that the EVA copolymer resin employed as the base resin and for the masterbatch had a vinyl acetate content of 28% and MI of 5.72 g/10 min. The rheological data provided in Table 1 indicates that a similar improvement in melt strength over that of the base resin (Control 10) was obtained with the composite produced using the higher VA content polymer.

EXAMPLES 11 AND 12

EVA composites having improved melt strength were prepared following the procedures and using the two EVA copolymers described in Examples 9 and 10. In these examples, however, the modified clay was a stearyl amine modified montmorillonite Nanomer® I.30P. Also, the masterbatch used contained 54% of the modified clay with the balance being an EVA carrier resin. Improved melt strengths were obtained with both the higher (20%) and lower (9%) vinyl acetate content EVA resin composites compared to the corresponding base resins. Rheological data are provided in Table 1 for the higher VA content composite (Example 11) and its corresponding base resin (Control 10) as well as the lower VA content composite (Example 12) and its corresponding base resin (Control 9).

EXAMPLE 13

To demonstrate the ability to obtain improved environmental stress crack resistance in addition to improved melt strength, the HDPE composite prepared in Example 6 and Control 6 were evaluated using the notched constant tensile load test. The test was conducted in accordance with ASTM D 5397 in 10% Igepal at 50° C. and 30 percent yield stress. Whereas the control resin failed at 14.2 hours, the HDPE composite prepared in accordance with the invention withstood 36.5 hours before failure. This represents a significant increase in environmental stress crack resistance.

TABLE 1

| Product | MI (g/10 min) | $G_o^*$ (dyne/cm$^2$) | $\Delta G_o^*$ (dyne/cm$^2$) | $\eta^*$ ratio |
| --- | --- | --- | --- | --- |
| -EX 1 | 1.46 | 1699 | 1557 | 1.72 |
| Control 1 | 1.70 | 142 | 0 | 1.0 |
| EX 2 | 1.66 | 1751 | 1609 | 1.71 |
| EX 3 | 1.72 | 435 | 293 | 1.19 |
| EX 4 | 0.50 | 1174 | 962 | 1.41 |
| Control 4 | 0.58 | 212 | 0 | 1.0 |
| EX 5 | 0.58 | 2507 | 2167 | 1.72 |
| Control 5 | 0.83 | 340 | 0 | 1.0 |
| EX 6 | 0.27 | 4873 | 2521 | 1.49 |
| Control 6 | 0.38 | 2352 | 0 | 1.0 |

TABLE 1-continued

| Product | MI (g/10 min) | $G_0^*$ (dyne/cm$^2$) | $\Delta G_0^*$ (dyne/cm$^2$) | $\eta^*$ ratio |
|---|---|---|---|---|
| EX 7 | 0.08 | 9866 | 5836 | 1.63 |
| Control 7 | 0.15 | 4030 | 0 | 1.0 |
| EX 8 | 0.06 | 15203 | 7477 | 1.37 |
| Control 8 | 0.08 | 7726 | 0 | 1.0 |
| EX 9 | 6.48 | 1376 | 1253 | 3.41 |
| Control 9 | 8.91 | 123 | 0 | 1.0 |
| EX 10 | 2.31 | 6959 | 6911 | 4.64 |
| Control 10 | 5.72 | 48 | 0 | 1.0 |
| EX 11 | 3.47 | 6416 | 6368 | 4.43 |
| EX 12 | 6.74 | 1648 | 1525 | 3.93 |

We claim:

1. An ethylene polymer composite having improved melt strength comprising:
    (a) 76 to 99.25 weight percent, based on the weight of the total composition, of an ethylene homopolymer or ethylene-$C_{3-8}$ α-olefin copolymer base resin;
    (b) 0.5 to 12 weight percent of an organically modified clay consisting of a smectite clay that has been ion-exchanged and intercalated with a dimethyl dihydrogenated allow quaternary ammonium ion; and
    (c) 0.25 to 12 weight percent of an ethylene polymer compatibilizing agent selected from the group consisting of ethylene-vinyl carboxylate copolymers and polymers of ethylene having from 0.1 to 8 weight percent ethylenically unsaturated carboxylic acid or derivative monomer copolymerized or grafted; the weight ratio of (b) to (c) ranging from 1:5 to 1:0.1.

2. The composite of claim 1 wherein the smectite clay is montmorillonite.

3. The composite of claim 2 wherein the montmorillonite clay is modified with dimethyl dihydrogenated tallow ammonium chloride and the modifier concentration is 90 to 130 meq/100 g.

4. The composite of claim 1 wherein the compatibilizing agent is a copolymer of ethylene and 3 to 35 weight percent vinyl acetate having a melt index from about 0.25 to 40 g/10 mm.

5. The composite of claim 1 wherein the compatibilizing agent is an ethylene polymer grafted with 0.2 to 4 weight percent maleic anhydride having a melt index from about 0.25 to 40 g/10 min.

6. The composite of claim 1 wherein the weight ratio of organically modified clay to compatibilizing agent is from 1:1 to 1:0.25.

7. The composite of claim 2 having a melt index of 0.01 to 100 g/10 min and complex viscosity ratio at 0.1 radians/sec greater than 1.10 and comprising 84 to 98.75 weight percent base resin, 0.25 to 8 weight percent montmorillonite clay modified with dimethyl dihydrogenated tallow ammonium chloride and having a modifier concentration of 90 to 130 meq/100 g, and 0.25 to 8 weight percent of a copolymer of ethylene and 3 to 35 weight percent vinyl acetate having a melt index from 0.25 to 40 g/10 mm; the weight ratio of modified montmorillonite clay to ethylene-vinyl acetate copolymer being from 1:1 to 1:0.25.

8. The composite of claim 2 having a melt index of 0.01 to 100 g/10 min and complex viscosity ratio at 0.1 radians/sec greater than 1.10 and comprising 84 to 98.75 weight percent base resin, 0.25 to 8 weight percent montmorillonite clay modified with dimethyl dihydrogenated tallow ammonium chloride and having a modifier concentration of 90 to 130 meq/100 g and 0.25 to 8 weight percent of an ethylene polymer graft with 0.2 to 4 weight percent maleic anhydride having a melt index from 0.25 to 40 g/10 min; the weight ratio of modified montmorillonite clay to grafted ethylene polymer being from 1:1 to 1:0.25.

9. A concentrate useful for the preparation of ethylene polymer composites having improved melt strength comprising 20 to 70 weight percent, based on the total weight of the concentrate, of a carrier resin selected from the group consisting of ethylene homopolymer and copolymers of ethylene and a comonomer selected from the group consisting of $C_{3-8}$ α-olefins, vinyl $C_{2-4}$ carboxylates and $C_{1-4}$ alkyl acrylates and $C_{1-4}$ alkyl methacrylates and 30 to 80 weight percent additives comprising an organically modified clay consisting of a smectite clay that has been ion-exchanged and intercalated with a dimethyl dihydrogenated tallow quaternary ammonium ion and an ethylene polymer compatibilizing agent selected from the group consisting of ethylene-vinyl carboxylate copolymers and polymers of ethylene having 0.1 to 8 weight percent ethylenically unsaturated carboxylic acid or derivative monomer copolymerized or grafted, the weight ratio of organically modified clay to compatibilizing agent ranging from 1:5 to 1:0.1.

10. The concentrate of claim 9 wherein the organically modified clay is a montmorillonite clay modified with dimethyl dihydrogenated tallow ammonium chloride and the modifier concentration is 90 to 130 meq/100 g and the compatibilizng agent is a copolymer of ethylene and 3 to 35 weight percent vinyl acetate or an ethylene polymer grafted with 0.2 to 4 weight percent maleic anhydride.

11. The concentrate of claim 10 containing 20 to 60 weight percent carrier resin, 40 to 80 percent of a combination of organically modified clay and compatibilizing agent present at a weight ratio of 1:1 to 1:0.25 and, optionally, up to 5 weight percent conventional compounding additives.

12. A concentrate useful for the preparation of ethylene-vinyl acetate composites having improved melt strength comprising 20 to 70 weight percent of an ethylene-vinyl acetate copolymer carrier resin and 30 to 80 weight percent organically modified clay consisting of a smectite clay that has been ion-exchanged and intercalated with a dimethyl dihydrogenated tallow quaternary ammonium ion.

13. The concentrate of claim 12 wherein the carrier resin is a copolymer of ethylene and 3 to 35 weight percent vinyl acetate and the organically modified clay is a montmorillonite clay modified with dimethyl dihydrogenated tallow ammonium chloride an the modifier concentration is 90 to 130 meq/100 g.

14. The concentrate of claim 13 containing 20 to 60 weight percent carrier resin and 40 to 80 weight percent organically modified clay.

15. The concentrate of claim 14 optionally containing up to 5 weight percent conventional compounding additives.

* * * * *